G. T. NICHOLS.
END GATE FASTENER.
APPLICATION FILED JULY 29, 1915.

1,199,915.

Patented Oct. 3, 1916.
2 SHEETS—SHEET 1.

George T. Nichols, INVENTOR

WITNESSES

BY

ATTORNEY

G. T. NICHOLS.
END GATE FASTENER.
APPLICATION FILED JULY 29, 1915.
1,199,915.
Patented Oct. 3, 1916.
2 SHEETS—SHEET 2.
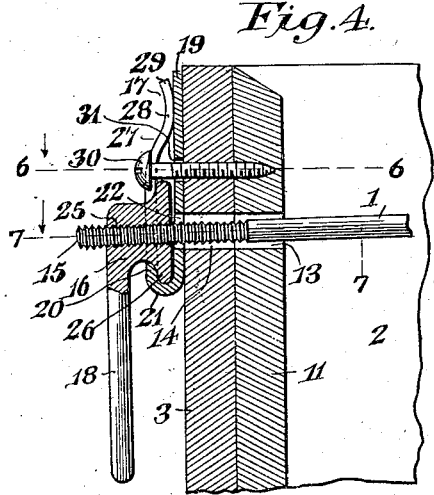
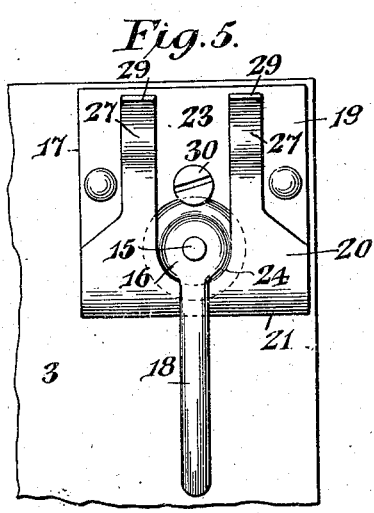
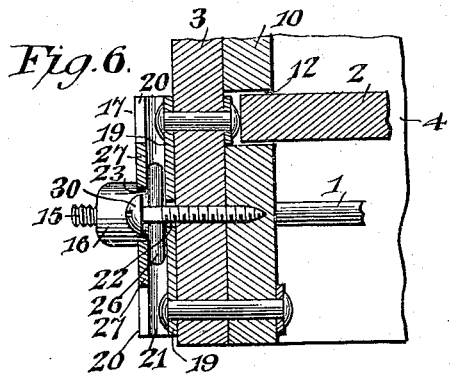
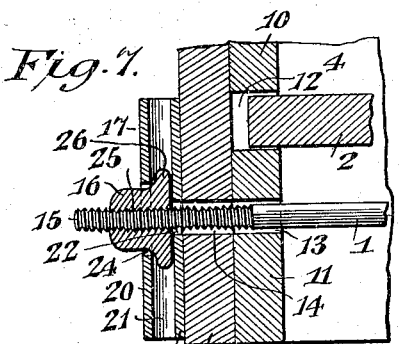
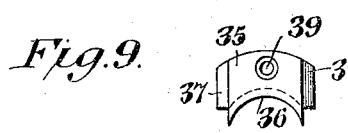
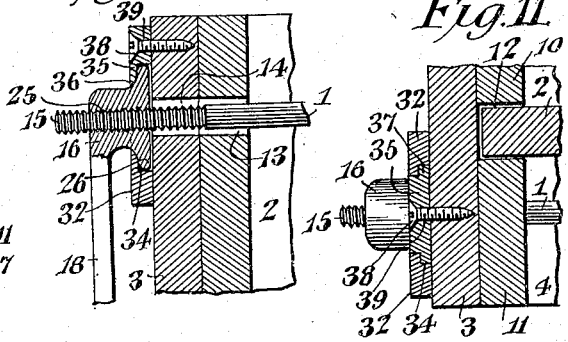
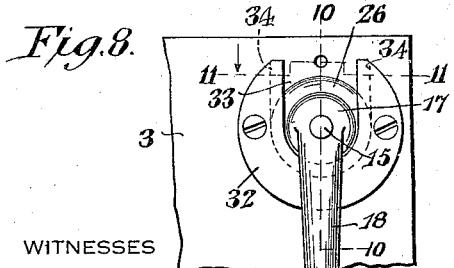
George T. Nichols, INVENTOR

UNITED STATES PATENT OFFICE.

GEORGE THOMAS NICHOLS, OF GAINESVILLE, TEXAS.

END-GATE FASTENER.

1,199,915.   Specification of Letters Patent.   Patented Oct. 3, 1916.

Application filed July 29, 1915. Serial No. 42,601.

*To all whom it may concern:*

Be it known that I, GEORGE T. NICHOLS, a citizen of the United States, residing at Gainesville, in the county of Cooke and State of Texas, have invented a new and useful End-Gate Fastener, of which the following is a specification.

The invention relates to improvements in end gate fasteners.

The object of the present invention is to improve the construction of end gate fasteners adapted for use in connection with end gates composed of two sections hinged together to facilitate their ready removal and replacement, and adapted to be locked in rigid relation as shown and described in Patent No. 1,099,391, granted to me June 9, 1914, and to provide a simple, practical, and inexpensive end gate fastener of strong and durable construction, adapted to form practically a solid end gate and capable of securely fastening the end gate between the sides of a wagon body or bed and of effectually preventing the end gate from becoming accidentally unfastened and lost.

A further object of the invention is to improve the construction of the end gate fasteners shown and described in Patent No. 1,110,339, granted to me Sept. 15, 1914, and in my Patent No. 1,118,145, granted to me November 24, 1914, and eliminate the interlocking connection between the main transverse rod and the side rods of said end gate fasteners, and enable a wagon body equipped with the end gate fastener of the present invention to present the perfectly smooth interior of an ordinary wagon body when the end gate is removed.

With these and other objects in view the invention consists in the construction and novel combination of parts hereinafter fully described, illustrated in the accompanying drawings, and pointed out in the claims appended hereto, it being understood that various changes in the form, proportion, size and minor details of construction, within the scope of the claims, may be resorted to without departing from the spirit or sacrificing any of the advantages of the invention.

Figure 1:
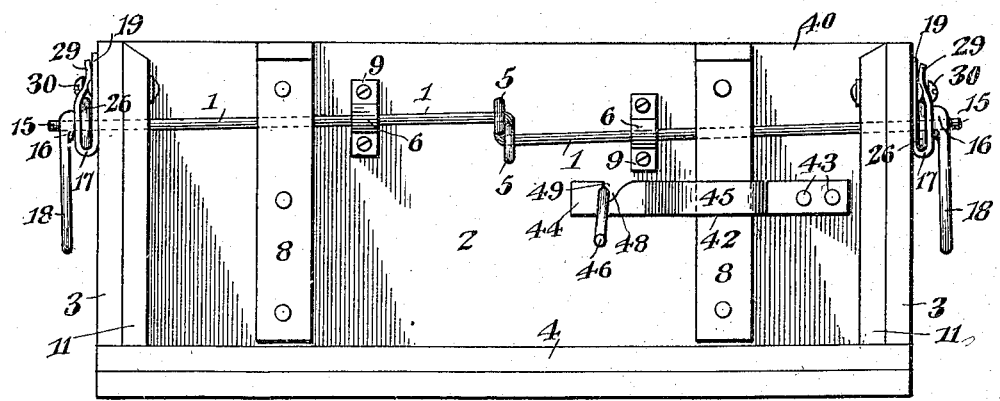
Figure 2:
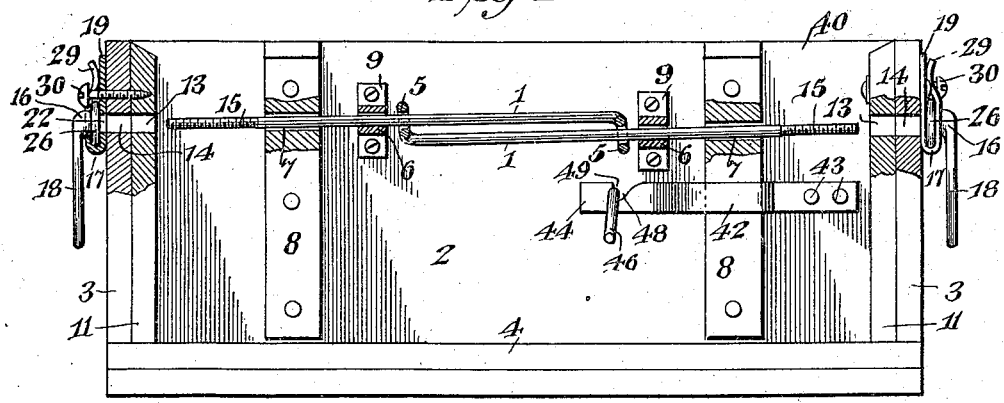
Figure 3:
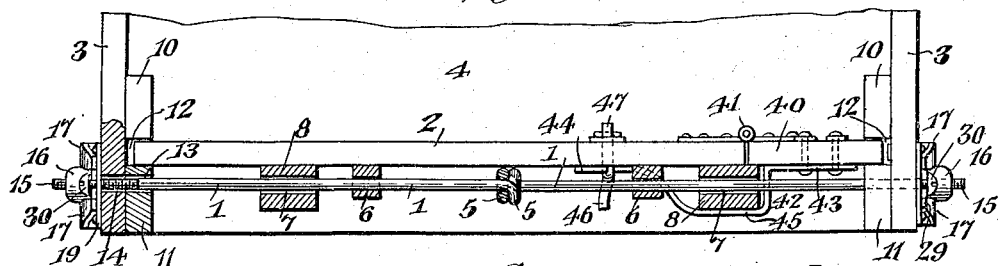

In the drawings:—Figure 1 is an end elevation of a wagon body provided with an end gate fastener constructed in accordance with this invention. Fig. 2 is a similar view, partly in section, the slidable rods being withdrawn from the sides of the wagon body to permit the removal of the end gate. Fig. 3 is a plan view, partly in section, the parts being arranged as shown in Fig. 1. Fig. 4 is a vertical sectional view through one side of the wagon body on an enlarged scale. Fig. 5 is a side elevation of a portion of the wagon body showing one of the bearing brackets and handle nuts. Fig. 6 is a horizontal sectional view on the line 6—6 of Fig. 4. Fig. 7 is a similar view on the line 7—7 of Fig. 4. Fig. 8 is an elevation of a portion of a wagon body having an end gate fastener provided with another form of bearing bracket. Fig. 9 is a detail view of the removable plate or section of the bearing bracket shown in Fig. 8. Fig. 10 is a vertical sectional view on the line 10—10 of Fig. 8, the removable plate or section being in position. Fig. 11 is a horizontal sectional view on the line 11—11 of Fig. 8, the removable plate or section being in position.

Like numerals of reference designate corresponding parts in all the figures of the drawings.

In the accompanying drawings, in which is illustrated the preferred embodiment of the invention, the end gate fastener which is also adapted for use on the side board gates of wagon bodies, comprises in its construction a pair of horizontal rods 1 of a length to extend from the center of an end gate 2 through the sides 3 of a wagon body or bed 4, and provided at their inner ends with integral laterally projecting eyes 5 extending from the rods at right angles thereto and slidably receiving the same, as clearly shown in Fig. 2 of the drawings. The eye at the inner end of each slidable rod slidably receives the other rod, the eye of one of the rods being extended upwardly and the other rod having its eye extended downwardly. These eyes are arranged to engage each other for limiting the relative outward movement of the rods. The slidable rods are mounted in guides 6 and extend through horizontally alined openings 7 of vertical cleats 8, secured to the outer face of the end gate 2. The guides 6 consist of horizontally disposed eyes arranged in alinement with each other and also with the openings 7 of the cleats 8 and provided with integral attaching plates or portions 9 secured to the outer face of the end gate by suitable fastening devices and located between the vertical cleats 8. The sides 3 of the wagon body are provided at their inner faces with spaced cleats 10 and 11 which form vertical guides or ways 12 for the terminal portions of the end gate, and the rear cleats 11 and the sides of the wagon body are provided with registering horizontally alined openings 13 and 14 forming passages for the outer ends 15 of the slidable rods 1, which are adapted to extend through the sides of the wagon body. The guides 6 form stops arranged to be engaged by eyes 5 of the inner ends of the rods 1 for limiting the inward movement of the same to prevent the said rods from being withdrawn from the openings 7 of the cleats 8 of the end gate. When the rods 1 are withdrawn as illustrated in Fig. 2 of the drawings, they are carried clear of the sides of the wagon body and the rear cleats thereof, and the end gate is then free to be removed from the wagon body.

The outer terminal portions 15 of the rods 1 are threaded and are adapted to be engaged by handle nuts 16, removably mounted in bearing brackets 17 which are secured to the outer faces of the sides of the wagon body. The handle nuts, which are provided with operating arms 18, are adapted to be rotated to place the rods under tension and to draw the sides of the wagon body into tight engagement with the end gate, thereby forming practically a solid end gate. The handles 18, which enable the nuts to be readily rotated, also operate as gravity devices for holding the nuts against rotary movement. The bearing brackets 17, which are preferably constructed of relatively thin steel, consist of inner and outer portions 19 and 20, connected by an integral bottom portion 21 formed by bending the material. The inner side 19 of the bearing bracket is bolted or otherwise secured to the wagon body and it is provided with an opening 22 arranged in alinement with the openings 13 and 14 of the wagon body and adapted to have the outer terminal 15 of the rod 1 passed through it. The outer side of the bearing bracket is provided with a vertical slot or opening 23 extending downwardly from the top of the bearing bracket and having a segmental wall 24 at its lower end, forming a bearing for the handle nut, which is adapted to be introduced into the bearing through the entrance slot or opening 23 and removed therefrom without detaching the bearing bracket from the side of the wagon body. The handle nut, which has a threaded opening 25 to engage the threaded terminal portion 15, is provided at its inner end with an annular flange 26 of greater diameter than the bearing opening and adapted to prevent the handle nut from moving outwardly through the lower bearing portion of the opening when it is mounted in the bracket. The upper portions 27 of the outer side 20 of the bearing bracket are located at the opposite sides of the slot or opening 23 and form resilient arms which are curved at 28 and present inner convex faces to and are in contact with the inner side of the bearing bracket. The upper terminals 29 of the resilient arms project slightly from the inner side of the bearing bracket, as clearly shown in Fig. 4 of the drawings, to enable the flange 26 of the handle nut to be readily introduced into the bearing bracket. The resilient arms confine the handle nut in the bearing bracket and prevent the said nut from accidentally jumping out of the bracket. In order to effectually lock the handle nut in the lower bearing portion of the opening 23, a central screw 30 or other suitable fastening device may be employed. The screw 30, which is located above the handle nut, passes through a central perforation 31 in the inner side 19 of the bearing bracket, and is embedded in the wagon body, as clearly illustrated in Fig. 4 of the drawings. The screw 30 may or may not be employed, and when removed, the handle nut may be readily sprung into and out of the bearing bracket. The handle nuts are arranged close to the sides of the wagon body and form a compactly arranged fastening means, and the slidable interlocking of the inner ends of the transverse rods hold the same against rotary movement when the handle nuts are rotated.

In Figs. 9 to 11 inclusive of the drawings is illustrated a bearing bracket 32 preferably in the form of a casting provided with a vertical opening 33 extending downwardly from the top of the bearing bracket and having a curved wall at the lower end to form a bearing for the handle nut. The bearing bracket 32 is provided at the edges of the opening 33 with a groove or recess 34, arranged at the inner face of the bearing bracket and adapted to receive the flange of the handle nut. The handle nut is confined in the bearing bracket 32 by means of a removable plate or section 35, having a curved lower edge 36 to complete the bearing of the bracket and provided at opposite sides with recessed projecting portions 37 which fit in the grooves or recesses 34 of the bearing bracket. The plate or section 35 is secured in the opening of the bearing bracket by means of a centrally arranged screw 38 or other suitable fastening device, passing through a perforation 39 in the said plate or section 35 and embedded in the wagon body. As shown and described in the said Patent No. 1,099,391, the end gate 2 is composed of a main section and a relatively small section 40 connected to the main section by suitable hinges 41, which are adapted to permit the end gate, when unfastened, to break outwardly to enable its ends to be readily disengaged from the cleats 10 and 11 of the sides of the wagon body or bed. The sections of the end gate are rigidly maintained in alinement by a latch comprising a horizontal arm or bar 42, suitably secured at its outer portion 43 to the outer face of the side section 40 at the outer side of the adjacent vertical cleat 8, and having its inner portion 44 fitted against the outer face of the main section of the end gate at the inner side of the said cleat 8. The bar or arm 42, which is rigid with the relatively small section 40, is provided at an intermediate point with an outward bend 45 fitting around the adjacent cleat 8, as clearly illustrated in Fig. 3 of the drawings. The inner portion 44 is detachably secured to the main section of the end gate by a movable locking device 46 consisting of a horizontal pivot 47 and an outer approximately L-shaped crank portion. The rigid arm 42 is provided at its inner portion with a substantially cylindrical opening 48 to receive the pivoted portion of the catch, and it has an entrance slot 49 communicating with the opening and extending upwardly and inwardly at an inclination to the upper edge of the arm 42, whereby it is necessary to arrange the L-shaped crank of the locking device in an upwardly inclined position and in alinement with the angularly disposed entrance slot to release the rigid arm and permit the same to move outwardy from the main section of the end gate when the latter breaks at the hinge joint. The L-shaped crank portion of the locking device is adapted to be swung downwardly from such inclined position to the position illustrated in Figs. 1 and 2 of the drawing, to lock the inner portion of the arm against the main section of the end gate.

What is claimed is:

1. An end gate fastener including transverse rods designed to be mounted on an end gate and being of a length to extend across the same and through the sides of a wagon body, said rods being provided with means for slidably connecting their inner portions to admit the retraction of the ends of the rods from the sides of the wagon and having outer threaded portions, and nuts located at the sides of the wagon body for detachably engaging the threaded ends of the rods to draw the same outwardly, and bind said sides against the end gate.

2. An end gate fastener including transverse rods of a length to extend across an end gate and through the sides of a wagon body, means for slidably mounting the rods on the end gate and for slidably connecting the inner portions of the rods and limiting the inward sliding of the same, and adjusting means located at the sides of the wagon body and connected with the rods for placing the same under tension.

3. An end gate fastener including transverse rods of a length to extend across an end gate and through the sides of a wagon body and provided at their inner ends with laterally projecting eyes slidably receiving the rods and arranged to engage each other to limit the relative outward movement of the rods, means for slidably mounting the rods on the end gate, and adjusting means located at the sides of the wagon body and connected with the rods for placing the same under tension.

4. The combination with a wagon body and an end gate provided with cleats having alined openings, of guides mounted on the end gate between the cleats and having openings arranged in alinement with the said cleat openings, transverse rods extending through the openings in the guides and the cleats, and being of a length to extend across the end gate and through the sides of a wagon body, said rods being provided at their inner ends with projecting eyes slidably receiving the rods and forming stops for limiting the relative outward movement of the rods, said eyes being located between the guides, which engage the eyes and limit the inward movement of the rods, and adjusting means located at the sides of the wagon and connected with the outer portions of the rods for placing the same under tension.

5. An end gate fastener including a rod designed to be mounted on an end gate and having an outer threaded portion adapted to extend through the side of a wagon body, a bearing bracket mounted on the side of the wagon body and having an open bearing, a nut supported in the open bearing independently of said rod and adapted to be introduced into and removed from the bearing without detaching the said bearing, said nut engaging the threaded portion of the rod for securing the end gate in the wagon body, and means on the said bracket for retaining the nut in the open bearing.

6. An end gate fastener including a rod designed to be mounted on an end gate and having an outer threaded portion adapted to extend through the side of a wagon body, a bearing bracket provided with means for mounting it on the side of the wagon body and having an opening extending to the top of the bracket, said bracket being provided at the bottom of the opening with a curved edge forming a bearing, a nut having operating means and mounted in the bearing of the bracket for engaging the threaded portion of the rod, said nut being removable through the said opening and provided with a flange interlocking it with the said bearing bracket, and means carried by the bracket in the opening to prevent the accidental removal of the nut, when the rod is detached therefrom.

7. An end gate fastener including a rod designed to be mounted on an end gate and having an outer threaded portion adapted to extend through the side of a wagon body, a bearing bracket provided with means for mounting it on the side of a wagon body and composed of inner and outer portions, the outer portion being provided with a bearing opening extending to the top of the outer side, and a flanged nut arranged in the bearing opening of the bracket and engaging the outer portion thereof, said bracket having resilient arms located at opposite sides of the said opening and arranged to confine the nut therein.

8. An end gate fastener including a rod designed to be mounted on an end gate and having an outer threaded portion adapted to extend through the side of a wagon body, a bearing bracket consisting of an inner portion having means for mounting it on the side of the wagon body and an outer side connected at the bottom with the inner side and provided with a bearing opening extending to the top of the outer side of the bracket, said outer side having resilient arms curved inwardly and arranged contiguous to the inner side of the bracket, and an operating nut mounted in the bearing opening and having a flange of greater diameter than the said opening and confined between the inner and outer sides of the bearing bracket by the said arms.

9. An end gate fastener, comprising a pair of rods slidably mounted on the end gate, and adapted to be extended longitudinally therefrom for engagement through the sides of a wagon body, and adjusting means engaging the said sides of the wagon body and the opposite outer ends of the rods to draw the latter outwardly through the sides and hold the rods in connected relation and to bind the sides against the end gate.

In testimony, that I claim the foregoing as my own, I have hereto affixed my signature.

GEO. THOMAS NICHOLS.

Copies of this patent may be obtained for five cents each, by addressing the "Commissioner of Patents, Washington, D. C."